May 25, 1965   M. A. SHERKIN   3,184,794
SEALING APPARATUS FOR TIRES
Filed July 13, 1961   4 Sheets-Sheet 1

INVENTOR
MORRIS A. SHERKIN
BY Featherstonhaugh & Co.
ATTORNEYS

May 25, 1965 M. A. SHERKIN 3,184,794
SEALING APPARATUS FOR TIRES
Filed July 13, 1961 4 Sheets-Sheet 3

INVENTOR
MORRIS A. SHERKIN
BY Featherstonhaugh & Co.
ATTORNEYS

May 25, 1965 M. A. SHERKIN 3,184,794
SEALING APPARATUS FOR TIRES
Filed July 13, 1961 4 Sheets-Sheet 4

INVENTOR
MORRIS A. SHERKIN

BY *Featherstonhaugh & Co.*
ATTORNEYS

United States Patent Office 3,184,794
Patented May 25, 1965

3,184,794
SEALING APPARATUS FOR TIRES
Morris A. Sherkin, 76 Ridelle Ave.,
Toronto, Ontario, Canada
Filed July 13, 1961, Ser. No. 123,839
4 Claims. (Cl. 18—18)

This invention relates to sealing apparatus for tires during the process of recapping or retreading them to provide for inflation of the tire in such processing operation. The invention is operable in combination with retreading and recapping apparatus.

In the retreading and recapping of tires, the tire is first of all fitted with what is known as a curing rim, which takes the form of a bag or tube similar to an inner tube fitted within the tire casing, after which a sectional interlocking steel harness is applied to hold it in the tire. The tire is then introduced to the mould to apply the retread or to recap it by way of the matrix and the bag is inflated to maintain the required pressure during the curing and vulcanizing of the retread. There are a number of disadvantages to this conventional method:

(a) It takes 3 to 5 minutes to introduce the curing rim and to interlock the harness for retaining it in the tire;

(b) A curing rim or bag very often will rupture under pressure during the operation, thus not only ruining the tire being processed but also requiring a replacement in the equipment of the bag for the processing of further tires;

(c) There is a substantial capital cost involved in curing rims and harness in respect thereto as well as a continual replacement cost of such equipment, in addition to the loss in tires, when such equipment deteriorates during processing. Finally, such processing has required in the past the use of various sized bags and harness to adapt tires of given diameter tolerance for use with one matrix and which is also a costly procedure.

The present invention avoids the general disadvantages of the prior art by providing an apparatus wherein the tire being processed is readily sealed and can be directly inflated without the use of harness, thereby eliminating extra time required for its installation and avoiding loss in equipment, etc. due to malfunctioning of such accessories while providing at the same time a method whereby tires of different sizes having a predetermined plus or minus diameter may be processed with the same matrix without alteration of the apparatus, except for a predetermined normal setting thereof.

The invention generally embodies forming an air chamber incorporating as an essential part a tire to be retreaded, spacing the beads of the tire a predetermined distance apart in terms of the external diameter of the tire being processed and subjecting said chamber to air pressure as to cause the tire casing to expand to normal degree, and then subjecting the tire to vulcanizing conditions in a conventional retreading procedure. The invention includes an apparatus for presetting the spacing of the beads of a tire being processed such that tires within a given practical plus or minus external diametrical tolerance may be correlated to the same matrix for retreading purposes.

The invention will be understood by reference to the following detailed specification taken in conjunction with the accompanying drawings, wherein—

Figure 1:
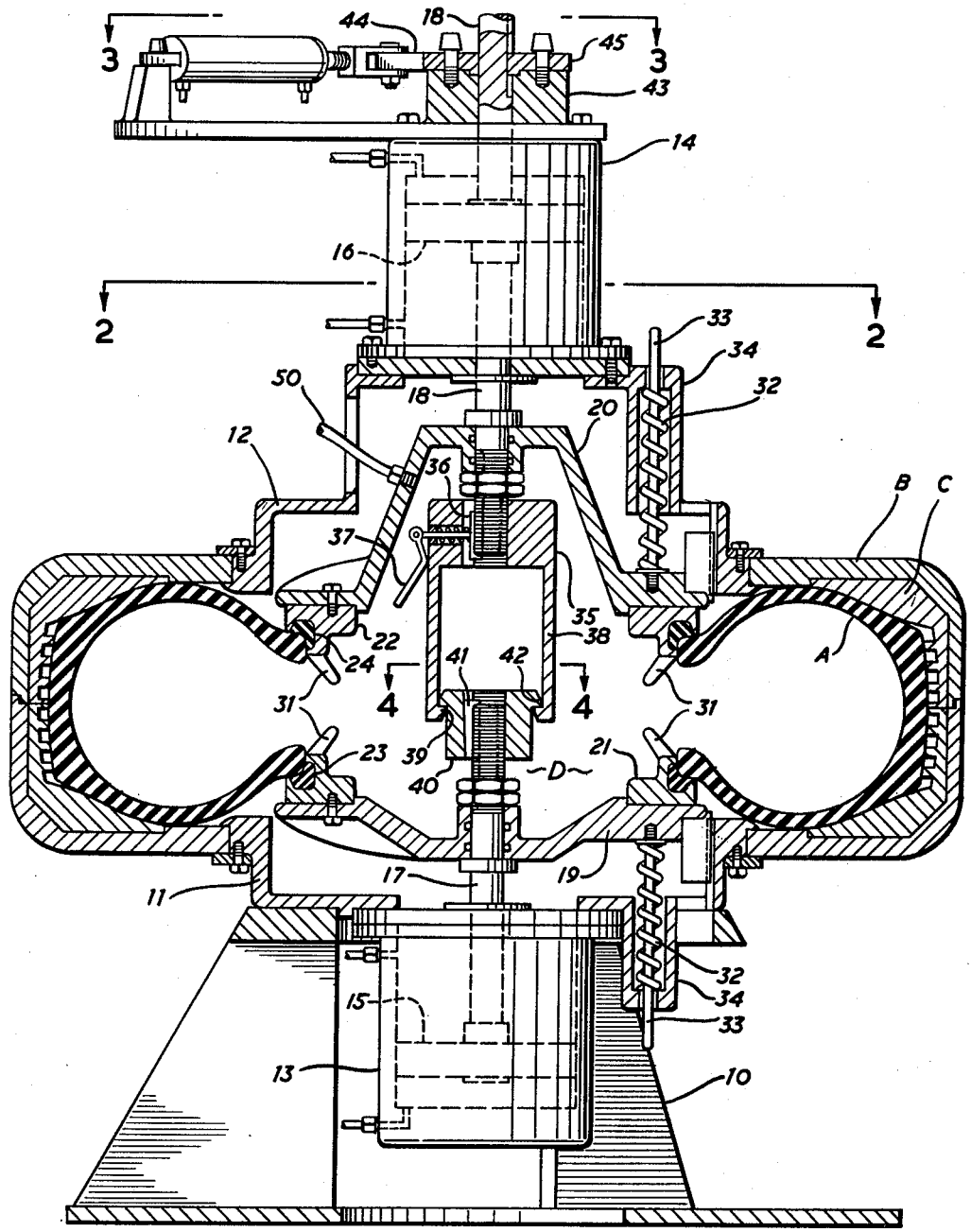
FIG. 1 is a sectional elevation of apparatus according to the present invention for recapping tires.

Referring to the drawings, A indicates a tire being retreaded within a mould B carrying the matrix C. The apparatus is carried on a base 10, the mould being secured by the mounting rims 11 and 12. A pair of opposed cylinders 13 and 14 are concentrically mounted, as shown, housing the pistons 15 and 16 carrying the piston rods 17 and 18 which are aligned and project upwardly and downwardly respectively from their respective pistons along the axial centre of the mould B and hence the tire A. These piston rods mount the movable tire sealing housings 19 and 20 respectively which are suitably keyed on or otherwise held on the rods against rotation. The housings 19 and 20 are of generally circular form and carry the annular tire bead sealing elements 21 and 22 adapted to carry the tire bead seals 23 and 24 respectively (more fully described hereinafter) and which are adapted to engage and seal the tire beads so that when disposed in sealing engagement therewith, a sealed air chamber D is provided of which the interior of the tire forms a substantial part. It will be obvious, therefore, at this stage that if the chamber D is subjected to air pressure of desired degree, the tire A will be inflated under required pressure to carry out the retreading and curing process without the aid of accessories heretofore normally employed.

Figure 7:
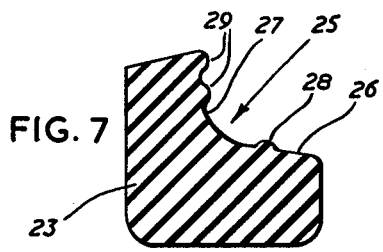
FIG. 7 is a sectional detail of the tire bead sealing means.
Figure 8:
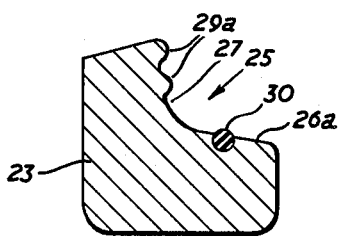
FIG. 8 is a similar view to FIG. 7 but showing an alternative construction.

The annular tire bead seals 23 and 24 are shown in cross-section in FIGS. 7 and 8. Dealing with FIG. 7 first of all, it will be noted that the annular seals 23 and 24 are generally L-shaped in cross-section, the seal of FIG. 7 being of rubber or rubber composition or similar material. This formation of seal provides a recess 25 for receiving the bead of a tire defined by the offset coextensive walls 26 and 27. Wall 26 has an annular sealing rib 28 projecting therefrom into recess 25 and which is adapted to be engaged with the base of the tire bead, the outer side of the tire bead being adapted, finally, for engagement with the annular sealing ribs 29 projecting into the recess 25 from wall 27. The alternative FIG. 8 shows a metal bead seal or ring which is of generally similar formation to that of FIG. 7 but incorporates in place of sealing rib 28 a rubber O-ring 30 mounted in wall 26a, while from wall 27, the metal sealing ribs 29a project into recess 25.

Figure 5:
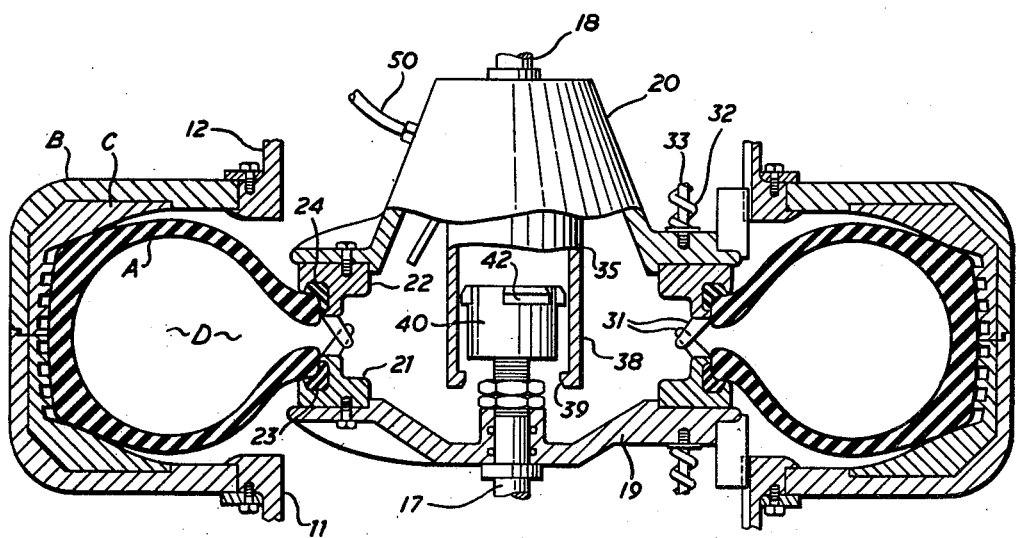
FIG. 5 is a transverse sectional detail of the mould and associated apparatus as shown in FIG. 1 illustrating the manner in which the beads of the tire are preliminarily compressed.
Figure 6:
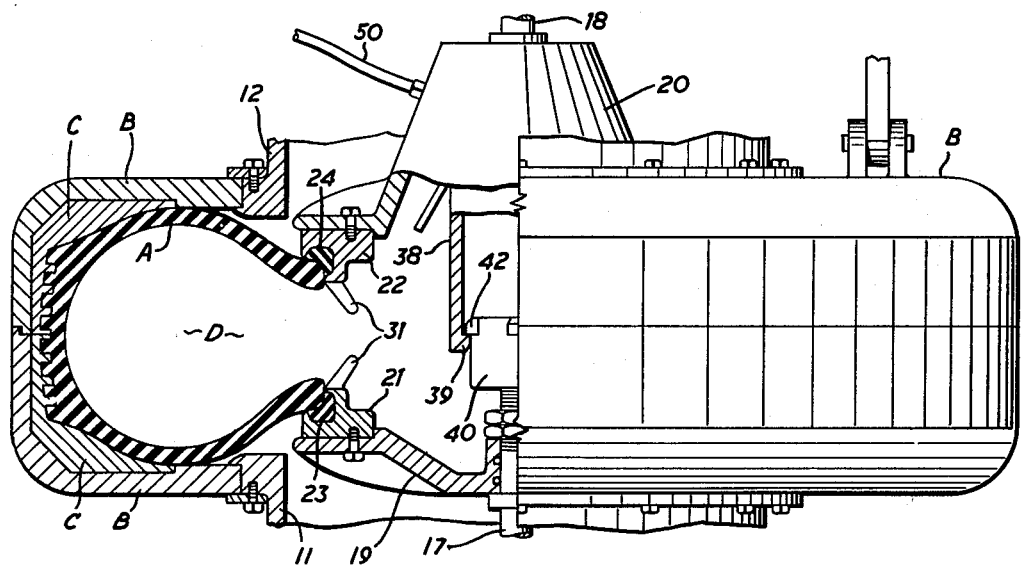
FIG. 6 is a somewhat similar view to FIG. 5 showing the tire beads moved to the predetermined space setting during curing.

Referring to FIG. 1, after a tire has been positioned in the mould, B, air pressure is introduced to the cylinders 13 and 14 to cause the piston rods 17 and 18 to advance towards one another which causes the bead sealing rings 23 and 24 to engage the beads of the tire A and, as shown in FIG. 5, the beads are caused to move towards one another until finally they are engaged with each other under pressure, which causes the base of the beads to override the sealing ribs 28 on seals 23, or O-ring 30 in the case of a structure as shown in FIG. 8, and will usually cause the side of the bead to engage the sealing ribs 29 or 29a as the case may be but regardless of this, sealing is initiated by seal ribs 28. The beads of the tire, therefore, are firmly sealed to establish the air-tight chamber D, and a further sealing effect will be established by engagement of the side of the tire beads with ribs 29 or 29a, if not already engaged, by expansion of the tire casing under force of air pressure introduced to chamber D.

In the movement of the sealing rings 23 and 24 towards the tire beads, a series of staggered interlapping guide fingers 31 on each of these rings serve as a guide moving over the edge of the bead to position the tire beads in the recess 25 of the sealing rings 23 and 24.

Figure 2:
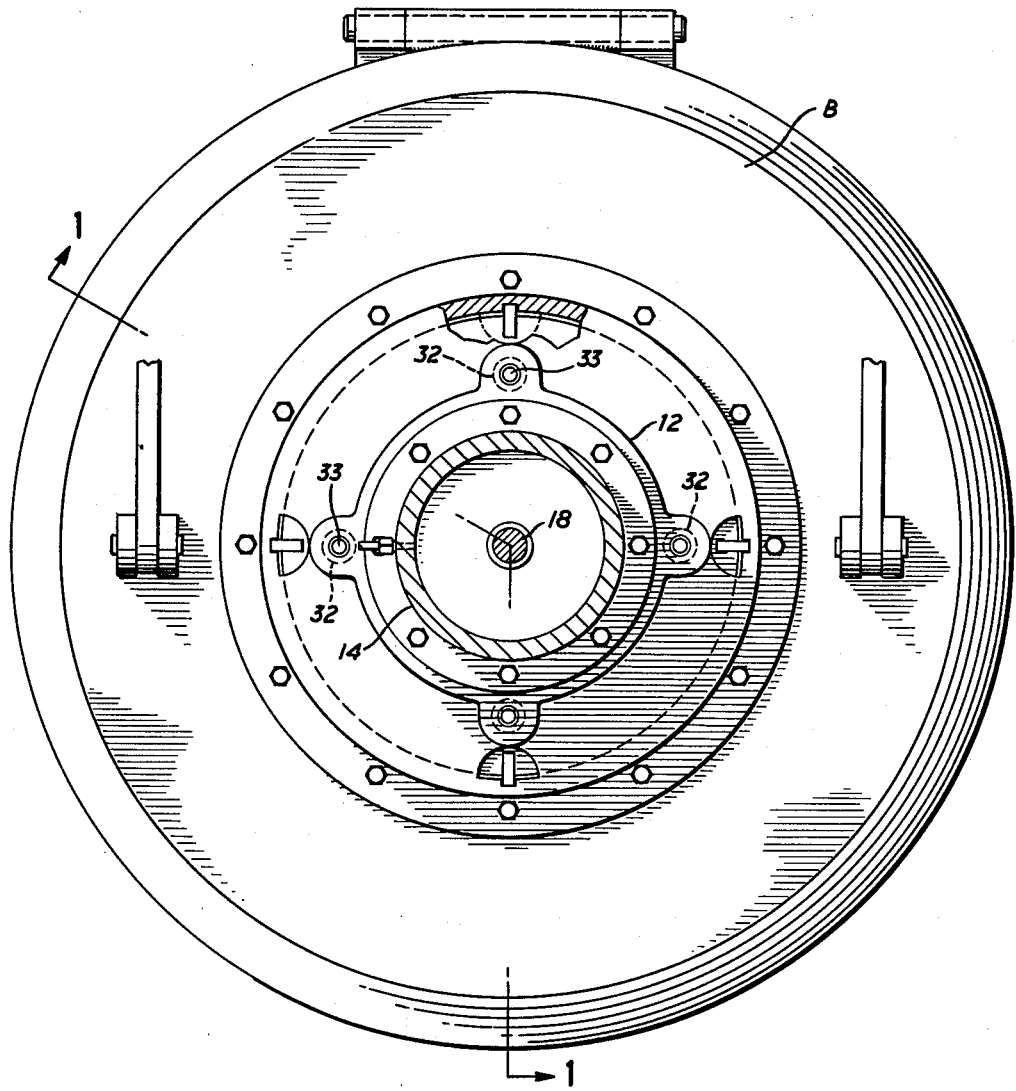
FIG. 2 is a section taken substantially along the line 2—2 of FIG. 1.
Figure 3:
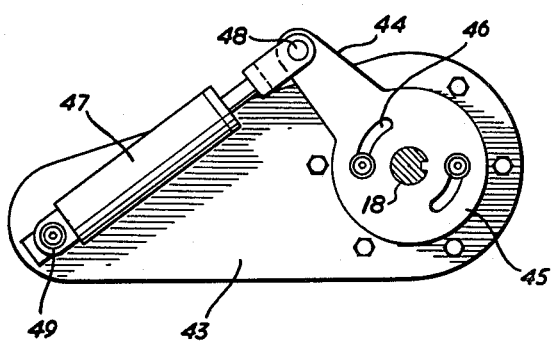
FIG. 3 is a top plan detail of means for causing interlocking of parts of the apparatus during processing for setting the spacing of the tire beads.
Figure 4:
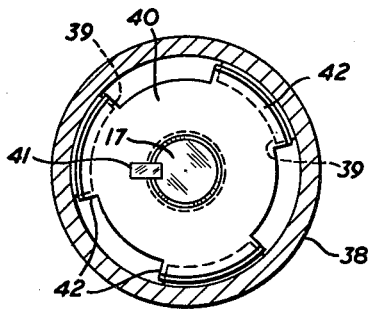
FIG. 4 is a sectional detail to illustrate the manner in which the parts are formed to provide for interlocking thereof.

The mounting rings 11 and 12 incorporate a series of stabilizing pressure springs 32 mounted to extend around the rods 33 carried by the said rings and which are carried in the housing sockets 34. As may be noted from FIG. 2, four of these are illustrated but any desired number might be employed. Accordingly, it is obvious that these springs exert an equalizing stable pressure against the tire sealing housings 19 and 20 which assure an even pressure application throughout the circumference of the sealing housings during operation.

It will be obvious, from the apparatus so far described, that recapping or retreading operations can be carried out without the various accessories previously used in the prior art for the purpose and, merely by employing a simple apparatus, herein disclosed, incorporating an air chamber of which the tire is a substantial part, the necessary pressure is readily produced to achieve the curing operation. However, it should be noted that with this simple apparatus, tires of a given plus or minus external diameter may be processed similarly, using the same matrix, without the use of additional accessories designed to adapt the tire size to the same matrix. This is achieved in the present apparatus by pre-setting simple elements thereof to locate and maintain the beads of the tire being processed in predetermined spaced relationship and which is correlated to the external diameter tolerance of the tire. In this instance, reference is made particularly to FIGS. 1 and 3 to 5 wherein it will be noted that on the inner ends of the piston rods 18, a cooperative locking means is employed which may be adjusted in a very simple manner and which functions to set the spacing between the beads of the tire, thus to adapt the tire in question to the matrix with which it is being processed. The rod 18 carries on its end a locking head 35 which can be adjusted axially of the rod in suitable manner such as by a screw-threaded connection therewith and by means of a suitable retractable key 36, or other means which might be employed, the head is locked in adjusted position on rod 18. The key may be readily tripped by a suitable lever 37 if desired.

The locking head 35 conveniently has the cylindrical extension 38 which incorporates around its lower inner periphery a series of radially inward projecting lugs 39 (see FIGS. 1, 4 and 5) and which are designed to cooperate with lugs of a second locking head carried on the inner end of rod 17. Locking head 40 of rod 17 conveniently takes the form of a cylindrical fitting and like locking head 35, may conveniently be adjusted by a screw thread on rod 17 so that it may be adjusted axially of the rod and by means of a conveniently slidable key 41, it is locked against rotation on rod 17 similarly to the locking of head 35 on rod 18. The head 40 is provided with a series of radially outwardly projecting lugs 42 which are designed to cooperate with lugs 39 of head 35 in setting the spacing of the tire beads during the processing operation. As noted from FIG. 4, lugs 39 can pass between lugs 42 when heads 35 and 40 are moved axially towards one another. Then when they have overlapped by rotating one of these shafts, the lugs can be brought into alignment with one another so that when the heads are retracted, the lugs will engage as to prevent further relative movement of these heads and by the same token will prevent any further relative movement between the tire sealing housings 19 and 20 and which thus set the spacing of the tire bead seals 23 and 24 which are in engagement with the tire. In consequence, the spacing of the beads of the tire is exactly controlled in a very simple manner.

In the present illustration, the shaft 18 is designed to be rotated for the purpose of causing the lugs of the locking heads 35 and 40 to align and eventually lock with one another. In this instance, this may be accomplished in the manner illustrated which includes a fitting 43 mounted on the end of cylinder 14 which is adapted to mount a suitable lever 44 carrying a plate-like head 45 which is keyed as shown to rod 18. Limited rotary movement of this plate is permitted by the arcuate slots 46 and rotation of the lever is readily effected by an air cylinder 47 having one end pivotally connected as at 48 to lever 44 and the other end anchored as at 49 on a suitable anchoring post carried by fitting 43. It is apparent, therefore, that once the locking heads 35 and 40 have been moved towards one another so that the lugs 39 of head 35 pass between the lugs 42 of head 40 and move therebeyond, the rotational movement of lever 44 by means of the air cylinder 47 will cause the lugs 39 of head 35 to rotate into alignment with lugs 42 of head 40. Thus, when the sealing housings 19 and 20 are moved to cause the tire bead seals to engage with the rim of a tire and the movement is continued to cause the beads of the tire to engage and effect an initial air seal with the two seals 23 and 24, the lugs of the locking heads have moved past one another and then by causing the piston 47 to actuate at a point when the lugs have passed one another, it is obvious that as pressure is established within the pressure chamber and the housings 19 and 20 move away from one another, they can only move to a predetermined degree in accordance with the setting of the locking heads since as soon as the locking lugs 39 and 42 of these heads engage with one another, the spacing of the tire beads is set and the spacing of the housings 19 and 20 relatively to one another is set. Accordingly, it is very obvious that by means of a simple adjustment of the locking heads 35 and 40, a desired positive spacing can be attained between the tire beads. This, of course, is a salient feature of the present invention because it will adapt tires of different sizes within a given plus or minus external diameter tolerance to processing by means of the same matrix. In other words, in some sizes a minimum spacing of the beads will cause the tread area of a tire of minus external diameter tolerance to fit with the matrix. However, in the case of larger diameters, within said tolerance limit, the beads are located and maintained in wider spacing by moving the beads to the predetermined setting of the locking heads as to cause the tread area thereof to fit with the matrix in question. Consequently, by adjusting the spacing to any given reasonable degree within the capacity of the apparatus, various sized tires within a given external diameter tolerance can be readily adapted to the same matrix. Of course, it is necessary in the case of tires of varying rim size to replace the bead sealing elements 21 and 22 for those of the appropriate size in question and this is very simply done as will be appreciated merely by unbolting these rings and rebolting the proper rings in position.

Accordingly, by means of an easily controlled simple apparatus, recapping and retreading of tires may be achieved without the necessity of all the various sized accessories previously used as well as the time and trouble incident thereto including the possibility of human error and the malfunctioning of such accessories. Moreover, the necessity for a large inventory of various sized accessories previously necessary is likewise eliminated.

Figure 9:
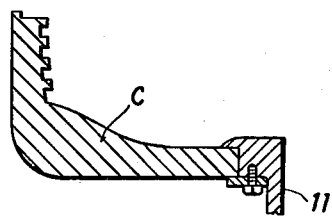
FIG. 9 is a sectional detail showing a sealing means of the present invention used directly in conjunction with the matrix.

While the apparatus, as shown in FIGS. 1 to 6, is illustrated in conjunction with a tire mould, it should be appreciated that the apparatus of the present invention can be adapted for use without necessarily employing a mould. In this connection, it should be appreciated that it can be adapted for use with a matrix alone and such arrangement is schematically illustrated in FIG. 9. In this instance, the housings 19 and 20 might be made of a larger diameter to fit with standard matrixes. Alternatively if desired, special matrixes may be made so as to fit with the diameter of the sealing housings such as illustrated for use with a mould. The connection, as shown in FIG. 9, may be effected in the same simple manner as that effected with the mould shown in the other figures.

While it is deemed desirable to employ suitable sealing rings such as 23 and 24 above described, it will be understood that sufficient sealing may be obtained by means of the elements 21 and 22. Consequently, it will be understood that within the principle of the invention a suitable seal effected in any desired way with the beads of the tire will meet all requirements to produce a pressure chamber such as D and wherein the tire itself forms a substantial part thereof.

It will be obvious that setting of the spacing between the tire bead is readily accomplished to the desired space setting required for a given tire. Assuming, for instance, the setting as shown in FIG. 1 is for a 4" spacing and it is desired to have a 5" spacing, it is only necessary to remove the keys from movement and rotate the heads to a predetermined gauge setting which can be easily effected by applying a gauge to the parts. Thus, any desired setting within the capacity of the size of the apparatus constructed may be achieved in a simple manner.

Assuming that the required setting has been achieved for a given processing, the tire is placed in the mould or is mounted in conjunction with the matrix if a matrix alone is used and pressure is supplied to the cylinders 13 and 14 to cause the piston rods and hence the sealing housings 19 and 20 to move towards one another. In the course of this movement, the guide fingers engage the edges of the beads of the tire and locate these beads in cooperative relationship with the tire bead seals 23 and 24 and as the housings and seals continue to move, as illustrated in FIG. 5, the beads contacting one another effect a firm seal with the tire bead seals, i.e. a positive seal with the rib 28 and contact in most cases with the ribs 29. During this movement when the lugs 39 and 42 have passed beyond one another, the piston 47 is initiated to rotate lever 44, thus to rotate head 38 and align the lugs 42 and 39. When this seal is effected, air pressure is introduced to the chamber by the air conduit 50 so that the parts of the chamber including the tire beads will move in a direction away from one another until the locking lugs 39 and 42 come into engagement at their point of appropriate setting. In this connection, the excess pressure of chamber D over pressure against the pistons 15 and 16 causes the pistons to retract until the proper setting is reached which is effected by the said locking lugs and in the course of this, the tire will align itself relatively to the matrix, i.e. the transverse theoretical central plane of the tire will align itself with the centre of the matrix as controlled by the predetermined space setting of the bead.

What I claim as my invention is:

1. Apparatus for recapping vehicle tires comprising, a frame, a base therefor, means for mounting a tread forming matrix on said base, means for mounting a tire to locate its tread receiving area in cooperative relationship to said matrix, a pair of opposed movable walls, upper and lower aligned cylinders on said frame, one disposed on each side of said matrix and located concentrically thereto, pistons carried in said cylinders having their piston rods projecting towards one another in vertically spaced apart relation, said piston rods each carrying one of said movable walls, a sealing ring on each of said walls inwardly thereof and of a diameter to fit the beads of said tire, said walls being movable by said piston rods relatively to one another to engage said seals with the beads of said tire in pressure sealing engagement to form an air-tight seal therewith whereby to form an air-tight chamber incorporating the hollow interior of said tire as an essential part thereof, and adjustable means for pre-setting the spacing of said beads from one another when said chamber is subjected to air pressure including an axially adjustable head carried on the outer end of each piston rod inwardly of said walls capable of telescoping with one another as said sealing rings are moved into pressure sealing engagement with said tire beads, and means for interlocking said heads with one another to limit travel of said seals and attached tire beads away from each other when said chamber is subjected to air pressure.

2. Apparatus as claimed in claim 1 in which said heads are formed with radially inwardly projecting lugs, the lugs in one head being normally disposed out of line with the lugs of the other head, whereby said heads may telescope, and means for rotating one of said piston rods to a predetremined degree when said heads are telescoped with one another as to bring said lugs of each head into alignment with one another, said lugs thereby engaging with one another when said rods are caused to move away from each other.

3. Apparatus for recapping vehicle tires comprising a frame, a base thereon, means for mounting a tread forming matrix on said base, means for mounting a tire to locate its tread receiving area in cooperative relationship to said matrix, a pair of opposed movable walls, means for moving said walls relatively towards one another, means in connection with said walls for engaging the beads of said tire under pressure to form an air-tight seal therewith whereby to form an air-tight chamber incorporating the hollow interior of said tire as an essential part of said chamber, and means for supplying air to said chamber to support the walls of said tire against said matrix, wherein: upper and lower aligned cylinders are carried by said frame, one disposed on each side of said matrix and located concentrically thereto, pistons carried in said cylinders having their piston rods projecting towards one another in vertically spaced apart relation, said piston rods each carrying one of said movable walls, movable by said cylinders relatively towards one another, a sealing ring carried by each of said walls inwardly thereof and of a diameter to fit with the beads of said tire, and means cooperating between said piston rods for pre-setting the spacing of said tire beads when said chamber is subjected to air pressure wherein the pre-setting means includes an axially adjustable head carried on the outer end of each piston rod, said heads being capable of telescoping with one another as said sealing rings are moved into pressure sealing engagement with said tire beads, and means for locking said heads with one another when said tire is subjected to air pressure.

4. Apparatus for recapping vehicle tires comprising a frame, a base therefor, means for mounting a tread-forming matrix on said base, means for mounting a tire to locate its tread-receiving area in cooperative relationship to said matrix, a pair of opposed movable walls, means for moving said walls relatively towards one another, means in connection with said walls for engaging the beads of said tire under pressure to form an air-tight seal therewith, whereby to form a substantially air-tight chamber incorporating the hollow interior of said tire as an essential part of said chamber, means for supplying air to said chamber to support the walls of said tire against said matrix, and a coupling means including a head carried by each of said walls, and contained in said chamber, said heads being designed and constructed to telescope with respect to each other as said means for engaging the beads of a tire move to form a seal with a tire in use and to releasably interlock to set the spacing of said walls and said tire beads when said chamber is subjected to air pressure, said heads being adjustable with respect to their respective wall to vary the spacing from their respective wall whereby the set spacing between said walls and tire beads when the chamber is subjected to pressure can be varied.

(References on following page)

References Cited by the Examiner
UNITED STATES PATENTS

| | | | |
|---|---|---|---|
| 2,291,506 | 7/42 | Shook | 18—17 |
| 2,824,336 | 2/58 | Weigold | 18—2 |
| 2,835,921 | 5/58 | White | 18—18 |
| 2,942,295 | 5/50 | Duerksen et al. | 18—18 |
| 2,989,779 | 6/61 | White | 18—18 |

FOREIGN PATENTS 1,266,063   5/61   France.

MICHAEL V. BRINDISI, *Primary Examiner.*